United States Patent [19]

Cockerham et al.

[11] Patent Number: 5,150,862
[45] Date of Patent: Sep. 29, 1992

[54] IN-FLIGHT REVERSER

[75] Inventors: Jefre H. Cockerham, Lake Worth; Edward B. Thayer, Palm Beach Gardens, both of Fla.

[73] Assignee: United Technologies Corporation, Hartford, Conn.

[21] Appl. No.: 640,333

[22] Filed: Jan. 11, 1991

[51] Int. Cl.⁵ .............................................. B64C 15/02
[52] U.S. Cl. ................................. 244/110 B; 244/52; 244/23 D; 239/265.27; 239/265.19
[58] Field of Search ................... 244/12.5, 12.3, 23 A, 244/23 B, 23 D, 52, 110 B, 73 R; 239/265.27, 265.33, 265.37, 265.39, 265.35, 265.19, 265.25, 265.41, 265.31; 60/230, 229, 232

[56] References Cited

U.S. PATENT DOCUMENTS

| | | | |
|---|---|---|---|
| 2,797,547 | 7/1957 | Meulien et al. | 244/73 R |
| 2,964,905 | 12/1960 | Hewson et al. | 60/35.54 |
| 3,333,793 | 8/1967 | Opfer, Jr. et al. | 244/52 |
| 3,388,878 | 6/1968 | Peterson et al. | 244/23 B |
| 3,806,068 | 4/1974 | Blythe et al. | 244/12.5 |
| 4,591,097 | 5/1986 | Thayer | 239/265.29 |
| 4,605,169 | 8/1986 | Mayers | 244/110 B |
| 4,641,782 | 2/1987 | Woodward | 239/265.29 |
| 4,760,960 | 8/1988 | Ward et al. | 239/265.26 |
| 4,767,055 | 8/1988 | Ward | 244/110 B |
| 4,836,451 | 6/1989 | Herrick et al. | 239/265.27 |

Primary Examiner—Galen Barefoot
Attorney, Agent, or Firm—Edward L. Kochey, Jr.

[57] ABSTRACT

Increased aircraft control is achieved by combining reverse thruster operation with splay capability. Each of the four door sets has a pair of vanes controllable to various parallel positions. Maximum opening at 26° from the vertical decreases in each direction from the maximum position. The vanes may be controlled to effect yaw and pitch control while maintaining a constant total effective flow area. Back pressure on the turbine is thereby unaffected.

8 Claims, 6 Drawing Sheets

IN-FLIGHT REVERSER

DESCRIPTION

1. Technical Field

The invention relates to reverse thrusters for aircraft and in particular to a reverser for in-flight use.

2. Background of the Invention

Gas turbine engines have been developed with vectoring exhaust nozzles. Such nozzles are directed to achieve pitch and yaw control. With such controllability the rudders and elevators of the aircraft may be reduced in size or eliminated. This reduces both drag and aircraft visibility.

In flight reversing is desirable because of the increased maneuverability achieved. In order to achieve the reversing thrust, the operation involves closing the normal exhaust nozzle and sending the gases through the reversing ports. It follows that the control from the vectoring nozzle is lost and with reduced control surfaces controllability of the aircraft is a problem.

It is also desirable that the in-flight reversing be carried out without a sudden change in engine operation. Therefore, the back pressure on the gas turbine should remain the same whether using the vectoring nozzle or the reverser ports. Accordingly, the effective flow area of the reverser ports should be the same as the nozzle, and should be maintained the same throughout any pitch or yaw control operations.

SUMMARY OF THE INVENTION

It is an object of the invention to achieve pitch and yaw control of the aircraft during in-flight thrust reversing.

Reverser flow passages are isolated from the gas turbine exhaust duct with the reverser exhaust valve. This valve may be opened to selectively connect the reverser flow passages to the gas turbine exhaust duct. At the same time the exhaust nozzle may be closed off whereby all of the exhaust gases pass through the reverser flow passages.

At the outlet of each reverser flow passage a door set comprised of two vanes is located. These vanes are pivotally secured to the fuselage along a pivot axis parallel to the axis of the fuselage. Each door set is located in a different quadrant of the cross section of the fuselage with one pivot axis of the door set being at a different location than the other. Maximum flow area between the vanes is achieved when the vanes are perpendicular to a line between the pivot axes of the two vanes. This results in a thrust having both a vertical and horizontal component.

With the vanes placed in the vertical position only vertical thrust is achieved, but a reduced flow area is experienced compared to the maximum. Design is established for vertical orientation of all vanes.

To achieve yaw operation the vanes are moved to direct the exhaust flow toward the side. As one pair of vanes is moved in this direction the effective area between the vanes increases since it is moving toward the perpendicular. The associated pair of vanes in moving the same direction moves away from the perpendicular area whereby the flow area of the first set is increased while the flow area of the second set is decreased. Controlling the appropriate angles permits maintenance of a constant effective flow area for the gas turbine engine discharge.

Pitch control is achieved by maintaining one door set close to the vertical while splaying the other door set at a wide angle from the vertical and opposite directions. This operation is also controlled to maintain constant effective flow area. The net vertical component of the exhaust gases is thereby controlled to achieve either a vertical upward or downward net force.

DESCRIPTION OF THE PREFERRED EMBODIMENT

Figure 1:
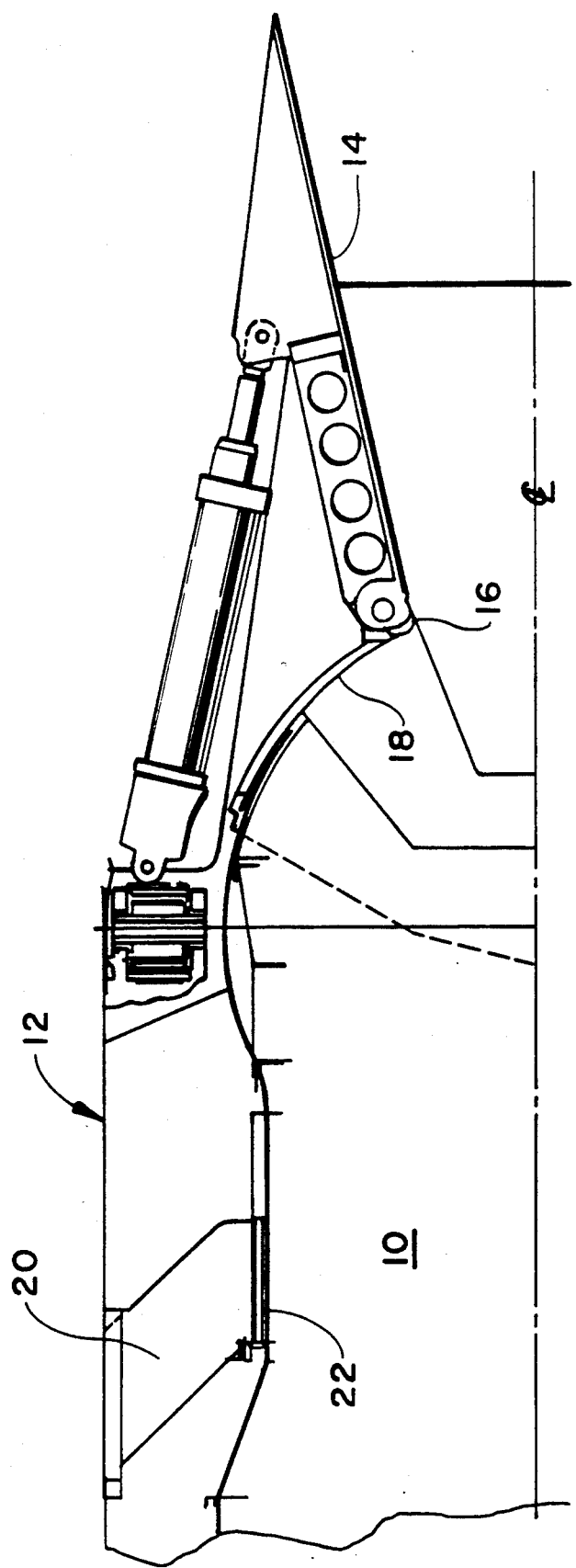
FIG. 1 is a half longitudinal section showing the gas turbine exhaust duct, exhaust nozzle and the reverser flow passage.

Referring to FIG. 1, a gas turbine engine exhaust duct 10 is located within fuselage 12. During normal operation a vectorable exhaust nozzle 14 receives gas from the exhaust duct. This nozzle is closable by forcing together portions 16 of the exhaust nozzle with sliding of spherical case 18.

A plurality of reverser flow passages 20 (the section here is rotated to better show these passages) are located to direct gas flow toward the front of the aircraft. A reverser exhaust valve 22 is arranged at the inlet at the flow passages and is axially slideable to place the reverser flow passages in fluid communication with the turbine exhaust duct. Closing of the exhaust nozzles and opening of the reverser valves are accomplished simultaneously so that the gas effluent from the gas turbine engine changes from flowing from the exhaust nozzle to flowing through the reverser flow passages. It is desirable to maintain the effective flow area constant during this operation to avoid changing the back pressure on the gas turbine.

Figure 2:
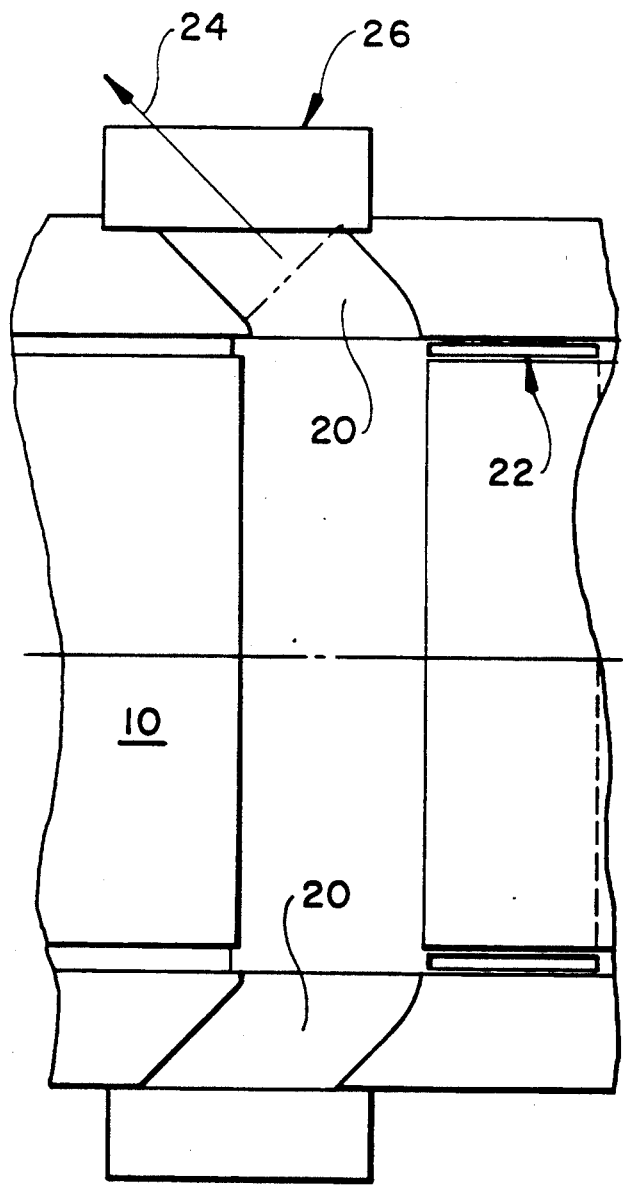
FIG. 2 is a longitudinal section through the reverser flow passage.

FIG. 2 illustrates the reverser valve 22 in the open position with flow 24 passing through the reverser flow passages. A door set 26 comprised of a pair of vanes 28 and 30 is operable to splay the exhaust gas horizontally.

Figure 3:
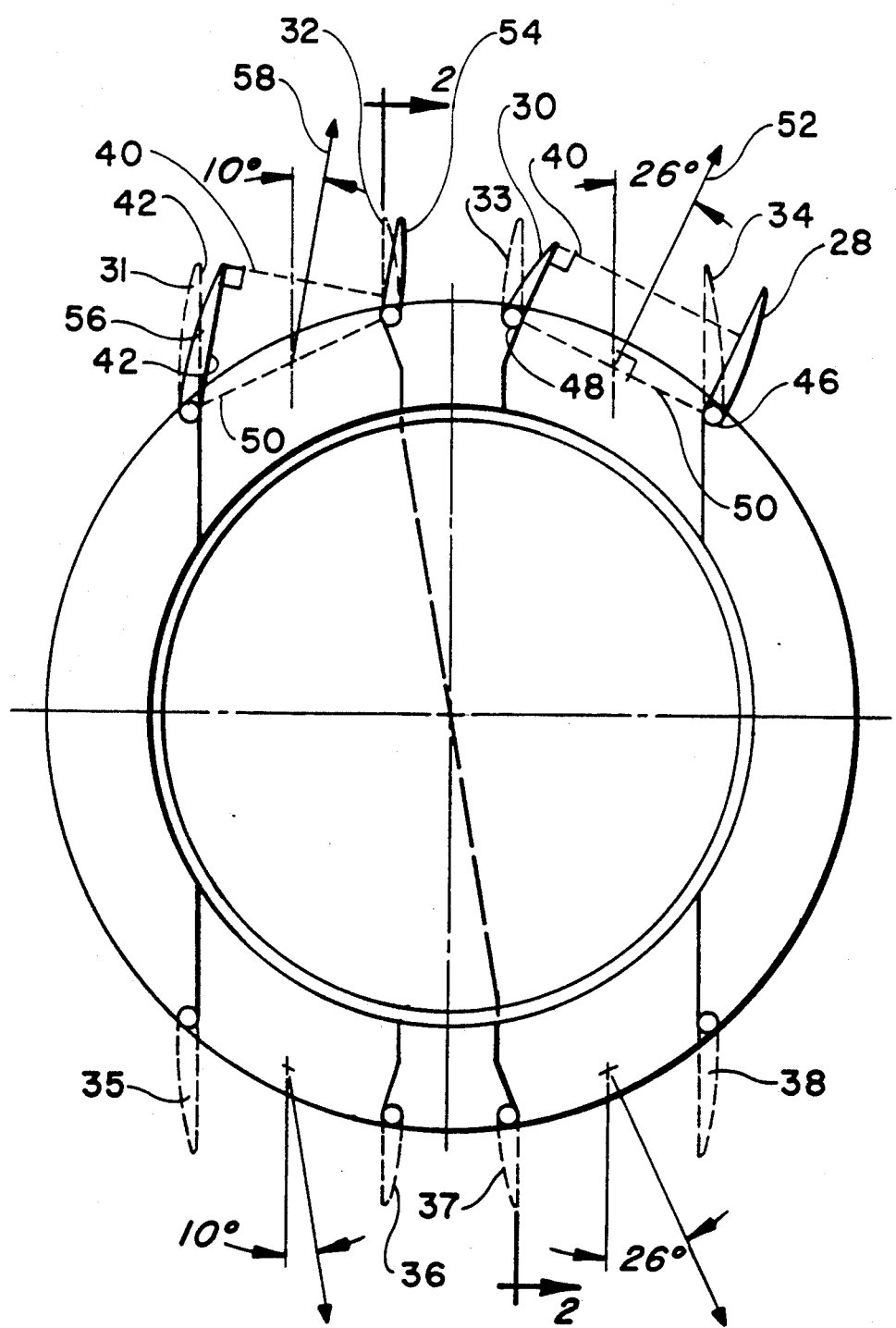
FIG. 3 is a cross section showing vanes in the yaw mode.
Figure 4:
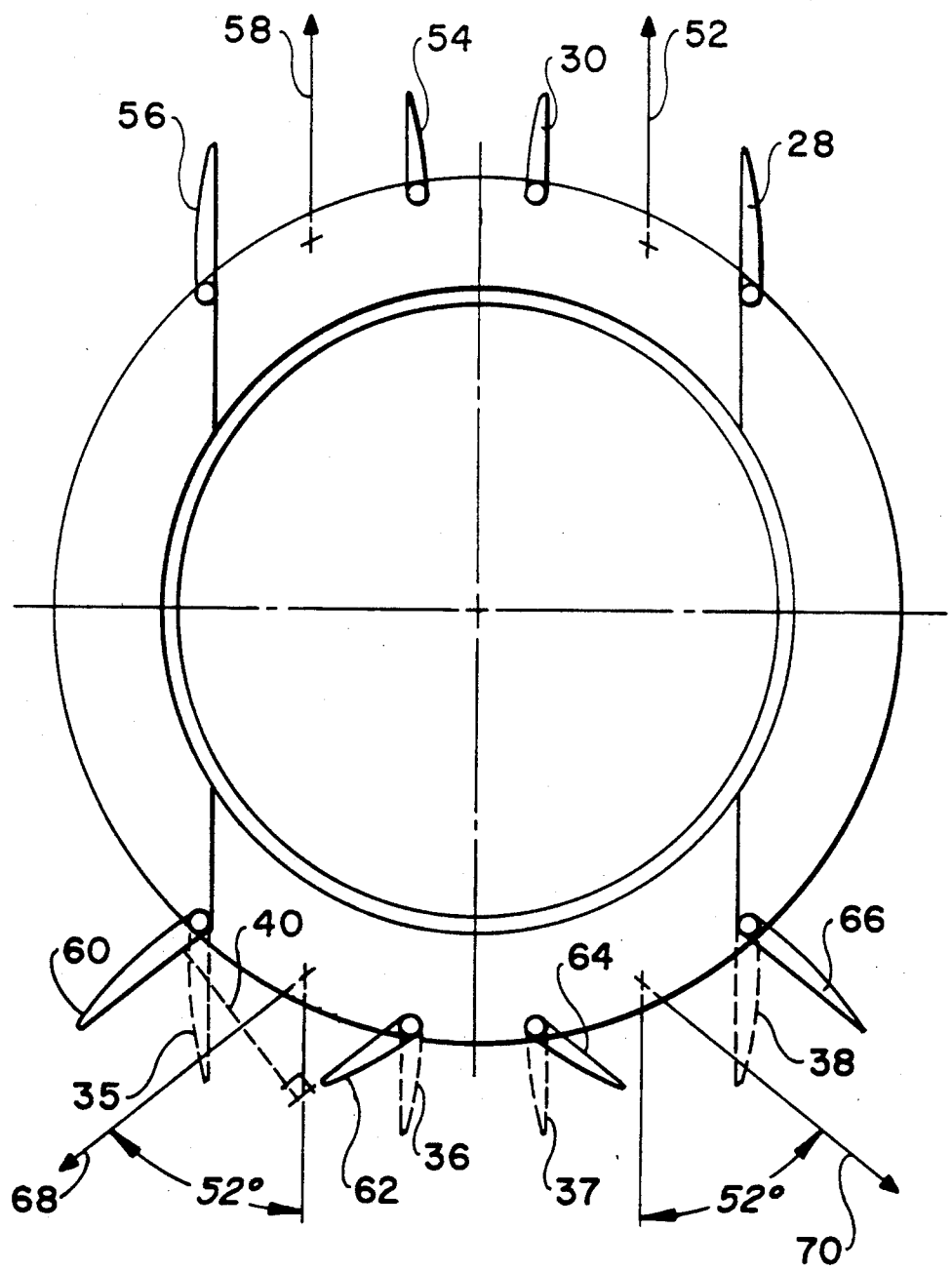
FIG. 4 is a cross section showing vanes in the pitch mode.
Figure 5:
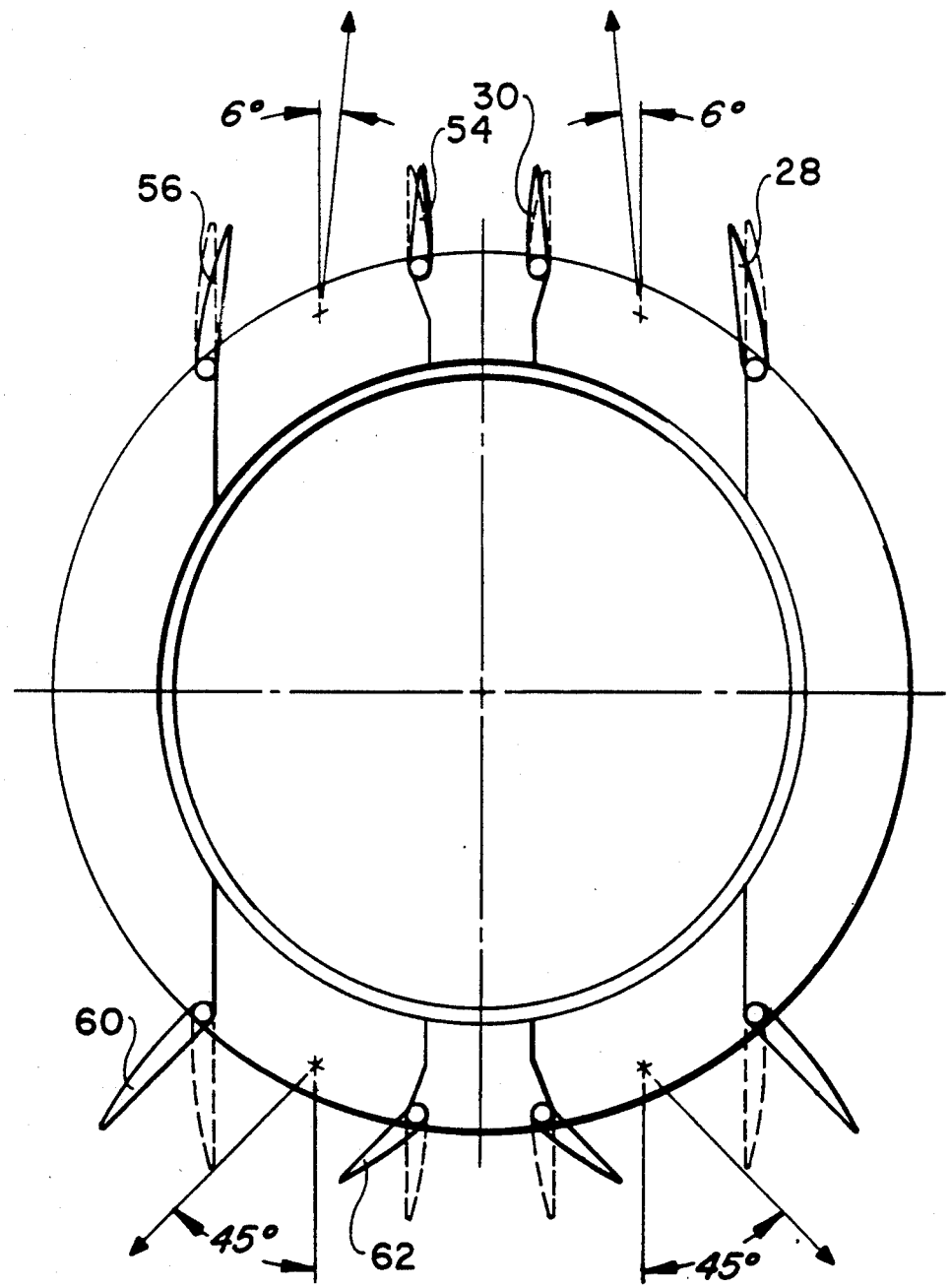
FIG. 5 is a cross section showing vanes in an alternate pitch mode.

The phantom showing of the vanes 31-38 in FIGS. 3-5 illustrate the vanes in the vertical position. This represents the nominal flow area which is equivalent to that through the exhaust nozzle at the dry point (no afterburning). Flow between these vanes is transonic and passes in a direction perpendicular to the most restrictive flow area. This is a line substantially perpendicular to a line 40 between the two parallel linear surfaces 42 forming the inside of each vane. Pivot points 46 of vane 28 and 48 of vane 30 are located on the round fuselage with a axis line 50 connecting the two located at an angle from the horizontal. This angle is 26° from the horizontal in the illustrated embodiment. Accordingly, when the vanes 28 and 30 are perpendicular to this line the maximum flow area is achieved with line 40 being at a maximum. The flow 52 passes at and angle of 26° from the vertical.

Looking now at vanes 54 and 56 in FIG. 3, these are moved to a position 10° from the vertical as shown by exhaust line 58. Since these vanes are moving away from the position perpendicular to the axis 50, the length of line 40 and the effective flow area decreases from that of the vertical position. Working in accordance with a cosine formula it is found that movement in this direction of 10° produces a reduction in flow area from the vertical equal to the increase of flow area from the vertical achieved by the 26° movement on the other side.

With this operation carried out by both the upper and lower sets of doors, it can be seen that the overall flow area and the average angle of thrust is 18°. However, since more of the flow passes along line 52, the effective yaw angle is greater than this.

In FIG. 4 a vertical differential thrust is achieved to achieve pitch control. In the upper half of the fuselage vanes 28, 30, 54 and 56 are maintained in the vertical position. In the lower half of the fuselage, however, vanes 60 and 62 are splayed 52° from the vertical in one direction while vanes 64 and 66 are splayed 52° from vertical in the other direction. This is the same angle (26°) between the maximum flow position and the vertical, but in the other direction, thereby resulting in the same effective flow area as the full vertical position. It can be appreciated that exhaust flows 52 and 58 have only the vertical component while exhaust flows 68 and 70 have only a portion of the forces as a vertical component. A net vertical thrust is thereby obtained for pitch control.

Since the flow area through the nozzles is effectively controlled by the line 40 perpendicular to the straight inner surfaces is effectively controlled by the line 40 perpendicular to the straight inner surfaces of the vanes consideration must be given to construction and orientation of the vanes in such a way that this perpendicular line from one vane falls on the other.

Looking at the 10° position in FIG. 3 it is noted that the perpendicular line 40 falls somewhat near the base of vane 54. It can be appreciated that if the vanes were moved in beyond the 10° this line would soon fall off of vane 54. Similarly, looking at the lower portion of FIG. 4, it can be seen that the perpendicular line 40 from vane 62 is approaching the lower portion of vane 60.

In order to achieve a rational operable range, the vanes closest to the centerline such as vanes 54 and 30 are shorter than vanes remote from the centerline such as vanes 56 and 28.

The limit on the possible length of each vane may restrict the range of operation. For instance, in FIG. 5 it is assumed that vane 62 is of such a length that operation is restricted to a 45° angle. In this case more flow area exists in these lower nozzles than in the original vertical position. To compensate for this the upper vanes 28, 30, 54 and 56 are moved inwardly 6° reducing the effective flow area of the upper vanes. Accordingly, the overall flow area is maintained constant.

Figure 6:
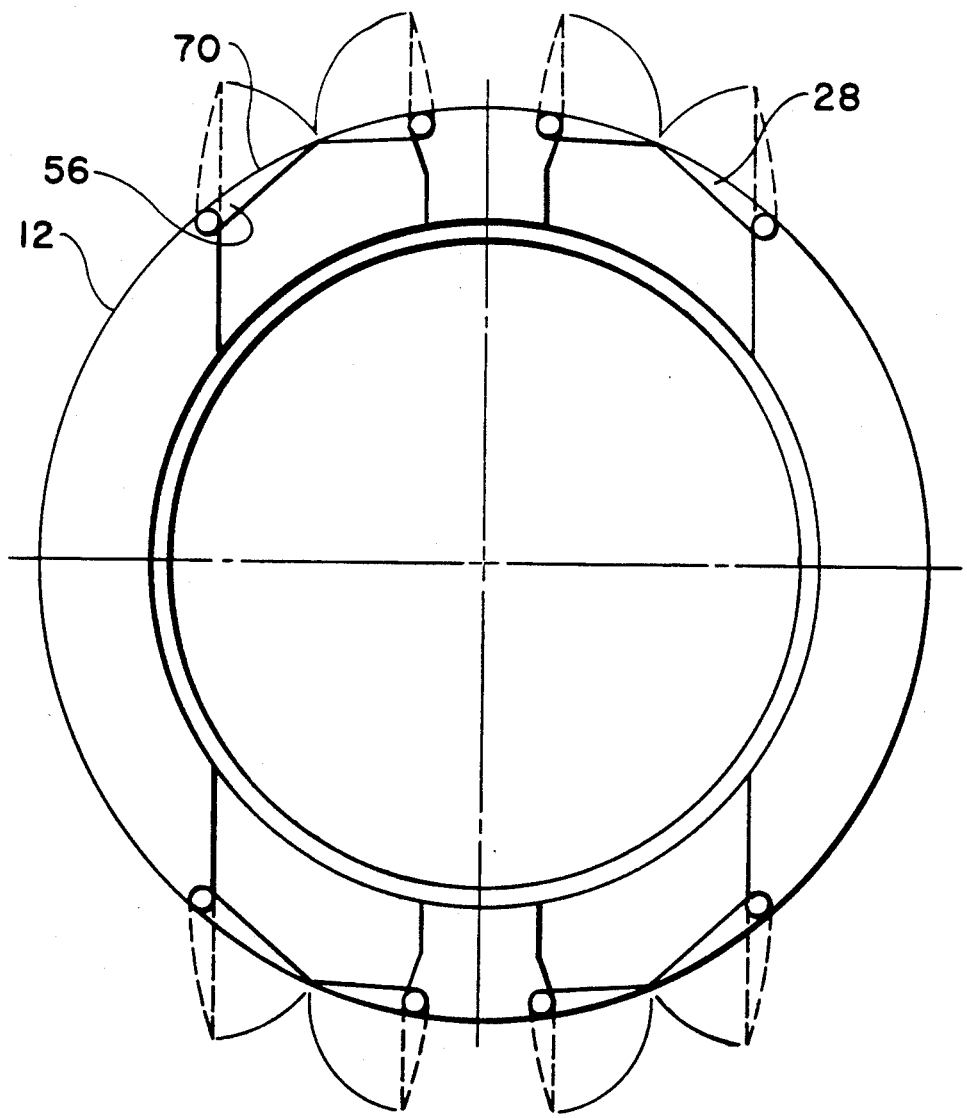
FIG. 6 is a cross section showing the vanes in the closed door mode.

As illustrated in FIG. 6, when not in operation the vanes having an arcuate outside surface 70 conforming to the round surface of fuselage 12 are closed and maintain the smooth contour. It is noted that in addition to the relative length of the vanes discussed above it is clear that the sum total of the length of the two vanes is limited to the arcuate distance between the pivot points of the vanes of each door set.

We claim:

1. An in-flight reverser for gas turbine engine aircraft comprising:
   a fuselage having a longitudinal fuselage axis from forward to rearward;
   a gas turbine engine exhaust duct within said fuselage;
   a closeable throat exhaust nozzle connected to receive gas from said gas turbine engine exhaust duct and to discharge the gas rearwardly;
   a plurality of reverser flow passages from said exhaust duct through said fuselage, arranged to direct gas flow with a forward component with respect to the fuselage;
   a reverser exhaust valve for selectively fluidly connecting said exhaust duct to said reverser flow passages;
   a door set at the outlet of each reverser flow passage with no intervening space between said door set and said reverser flow passage;
   each door set comprising a pair of vanes pivotally secured to said fuselage along a pivot axis parallel to said fuselage axis; and
   means for controlling said doors to various positions around said pivot axis of each door, keeping each pair of doors parallel to each other, and maintaining the total effective flow area of all of said ports constant.

2. A reverser as in claim 1:
   the pivot axis of each vane of each door set being at different elevations with respect to a level aircraft, with each vane being capable of vertical orientation with respect to a level aircraft.

3. A reverser as in claim 2:
   the pivot axis of each door set which is closest to a vertical centerline through said fuselage also being the pivot axis most remote from a horizontal centerline through said fuselage.

4. A reverser as in claim 3:
   said fuselage being round in cross section and divided into imaginary quadrants by vertical and horizontal centerlines; and
   said pivot axis located substantially along the surface of said fuselage.

5. A reverser as in claim 4:
   said vanes arcuately shaped on the outside surface forming an arc continuous with the outer surface of said fuselage when said vanes are closed.

6. A reverser as in claim 5:
   said vanes having a linear inner surface from said pivot axis to the tip of the vanes; and
   said vanes controllable to place the inner surfaces of the vanes of each door set parallel to each other in various angular open positions.

7. A reverser as in claim 6:
   the vane of each door set closest to a vertical centerline through said fuselage being shorter than the other vane of the door set.

8. A reverser as in claim 3:
   the vane of each door set closest to a vertical centerline through said fuselage being shorter than the other vane of the door set.

* * * * *